US010824567B2

(12) United States Patent
Williams et al.

(10) Patent No.: US 10,824,567 B2
(45) Date of Patent: Nov. 3, 2020

(54) SELECTIVELY PREVENTING PRE-COHERENCE POINT READS IN A CACHE HIERARCHY TO REDUCE BARRIER OVERHEAD

(71) Applicant: INTERNATIONAL BUSINESS MACHINES CORPORATION, Armonk, NY (US)

(72) Inventors: Derek E. Williams, Round Rock, TX (US); Hugh Shen, Round Rock, TX (US); Guy L. Guthrie, Austin, TX (US); William J. Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 16/209,604

(22) Filed: Dec. 4, 2018

(65) Prior Publication Data
US 2020/0174931 A1 Jun. 4, 2020

(51) Int. Cl.
G06F 12/00 (2006.01)
G06F 12/084 (2016.01)
G06F 9/52 (2006.01)
G06F 9/30 (2018.01)
G06F 12/12 (2016.01)

(52) U.S. Cl.
CPC ............ *G06F 12/084* (2013.01); *G06F 9/522* (2013.01); *G06F 9/3004* (2013.01); *G06F 9/30087* (2013.01); *G06F 12/12* (2013.01); *G06F 2212/1021* (2013.01)

(58) Field of Classification Search
CPC ............... G06F 12/084; G06F 9/522; G06F 2212/1021; G06F 12/12; G06F 9/3004; G06F 9/30087
USPC ................... 711/118, 141, 122, 125
See application file for complete search history.

(56) References Cited

U.S. PATENT DOCUMENTS

| 5,875,464 | A | 2/1999 | Kirk |
| 6,324,623 | B1 | 11/2001 | Carey |
| 7,475,191 | B2 * | 1/2009 | Guthrie ................. G06F 9/3004 711/118 |
| 7,549,025 | B2 | 6/2009 | Cypher et al. |
| 7,676,636 | B2 | 3/2010 | Cypher et al. |
| 7,698,504 | B2 | 4/2010 | Cypher et al. |

(Continued)

*Primary Examiner* — Mardochee Chery
(74) *Attorney, Agent, or Firm* — David Quinn; Brian F. Russell

(57) ABSTRACT

A data processing system includes a processor core having a shared store-through upper level cache and a store-in lower level cache. The processor core executes a plurality of simultaneous hardware threads of execution including at least a first thread and a second thread, and the shared store-through upper level cache stores a first cache line accessible to both the first thread and the second thread. The processor core executes in the first thread a store instruction that generates a store request specifying a target address of a storage location corresponding to the first cache line. Based on the target address hitting in the shared store-through upper level cache, the first cache line is temporarily marked, in the shared store-through upper level cache, as private to the first thread, such that any memory access request by the second thread targeting the storage location will miss in the shared store-through upper level cache.

20 Claims, 14 Drawing Sheets

(56) References Cited

U.S. PATENT DOCUMENTS

| | | |
|---|---|---|
| 7,917,698 B2 | 3/2011 | Cypher et al. |
| 9,047,197 B2* | 6/2015 | Chou .................... G06F 9/3004 |
| 9,223,709 B1* | 12/2015 | O'Bleness .......... G06F 12/0864 |
| 9,268,710 B1 | 2/2016 | Cypher et al. |
| 9,274,856 B2 | 3/2016 | Guthrie et al. |
| 9,632,942 B2 | 4/2017 | Guthrie et al. |
| 9,959,213 B2 | 5/2018 | Guthrie et al. |
| 2006/0085603 A1* | 4/2006 | Guthrie ............... G06F 9/30087 |
| | | 711/141 |
| 2015/0286569 A1 | 10/2015 | Guthrie et al. |
| 2016/0055083 A1* | 2/2016 | Rozario ................ G06F 12/084 |
| | | 711/125 |
| 2016/0062892 A1* | 3/2016 | Guthrie .................. G06F 12/12 |
| | | 711/122 |
| 2018/0314646 A1* | 11/2018 | Xu ...................... G06F 12/0871 |
| 2019/0056964 A1* | 2/2019 | Abdallah .............. G06F 9/3806 |

* cited by examiner

FIG. 5A
FIG. 5B
FIG. 5C
FIG. 5D

US 10,824,567 B2

SELECTIVELY PREVENTING PRE-COHERENCE POINT READS IN A CACHE HIERARCHY TO REDUCE BARRIER OVERHEAD

BACKGROUND OF THE INVENTION

The present invention relates generally to data processing and, in particular, maintaining memory coherence and cumulativity among other memory consistency properties in a data processing system.

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of shared memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a hardware-based cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of coherence states stored in association with the cache lines of each cache hierarchy, as well as a set of coherence messages utilized to communicate the coherence state information between cache hierarchies and a set of actions taken by the cache memories in response to the coherence messages to preserve coherency. In a typical implementation, the coherence state information takes the form of the well-known MESI (Modified, Exclusive, Shared, Invalid) protocol or a variant thereof, and the coherency messages indicate a protocol-defined coherency state transition in the cache hierarchy of the requestor and/or the recipients of a memory access request.

In some prior art SMP computer systems, an upper level (e.g., L1) cache is implemented as a store-through cache and is shared by multiple hardware threads of execution. A lower level (e.g., L2) cache is implemented as a store-in cache and serves as the point of coherency for cache lines accessed by the various hardware threads. This cache architecture is vulnerable to certain types of potential memory consistency model violations including coherence and cumulativity violations arising because the shared store-through upper level cache makes updates of one thread immediately visible to all other hardware threads sharing the upper level cache. To prevent these violations arising from pre-coherence point accesses to cache lines in the upper level cache, barrier requests and various inter-thread interlocks must be used to manage accesses between different hardware threads to common cache lines.

BRIEF SUMMARY

The present disclosure provides an improved data processing system, processing unit, and cache hierarchy that simplify the maintenance of coherence and reduce barrier overhead by selectively preventing pre-coherence point reads to an upper level cache in a cache hierarchy in certain intervals where certain same or shared thread stores are in progress from the upper level cache to a lower level cache serving as the coherence point.

In at least one embodiment, a data processing system includes a processor core having a shared store-through upper level cache and a store-in lower level cache. The processor core executes a plurality of simultaneous hardware threads of execution including at least a first thread and a second thread, and the shared store-through upper level cache stores a first cache line accessible to both the first thread and the second thread. The processor core executes in the first thread a store instruction that generates a store request specifying a target address of a storage location corresponding to the first cache line. Based on the target address hitting in the shared store-through upper level cache, the first cache line is temporarily marked, in the shared store-through upper level cache, as private to the first thread, such that any memory access request by the second thread targeting the storage location will miss in the shared store-through upper level cache.

BRIEF DESCRIPTION OF THE SEVERAL VIEWS OF THE DRAWINGS

FIGS. 4A-4D depict instruction sequences respectively illustrating a load-to-load dependency, a load-to-store dependency, a store-to-load dependency, and a store-to-store dependency;

FIGS. 5A-5D illustrate instruction sequences in which barriers are utilized to enforce load-to-load ordering, load-to-store ordering, store-to-load ordering, and store-to-store ordering;

DETAILED DESCRIPTION

Figure 1:
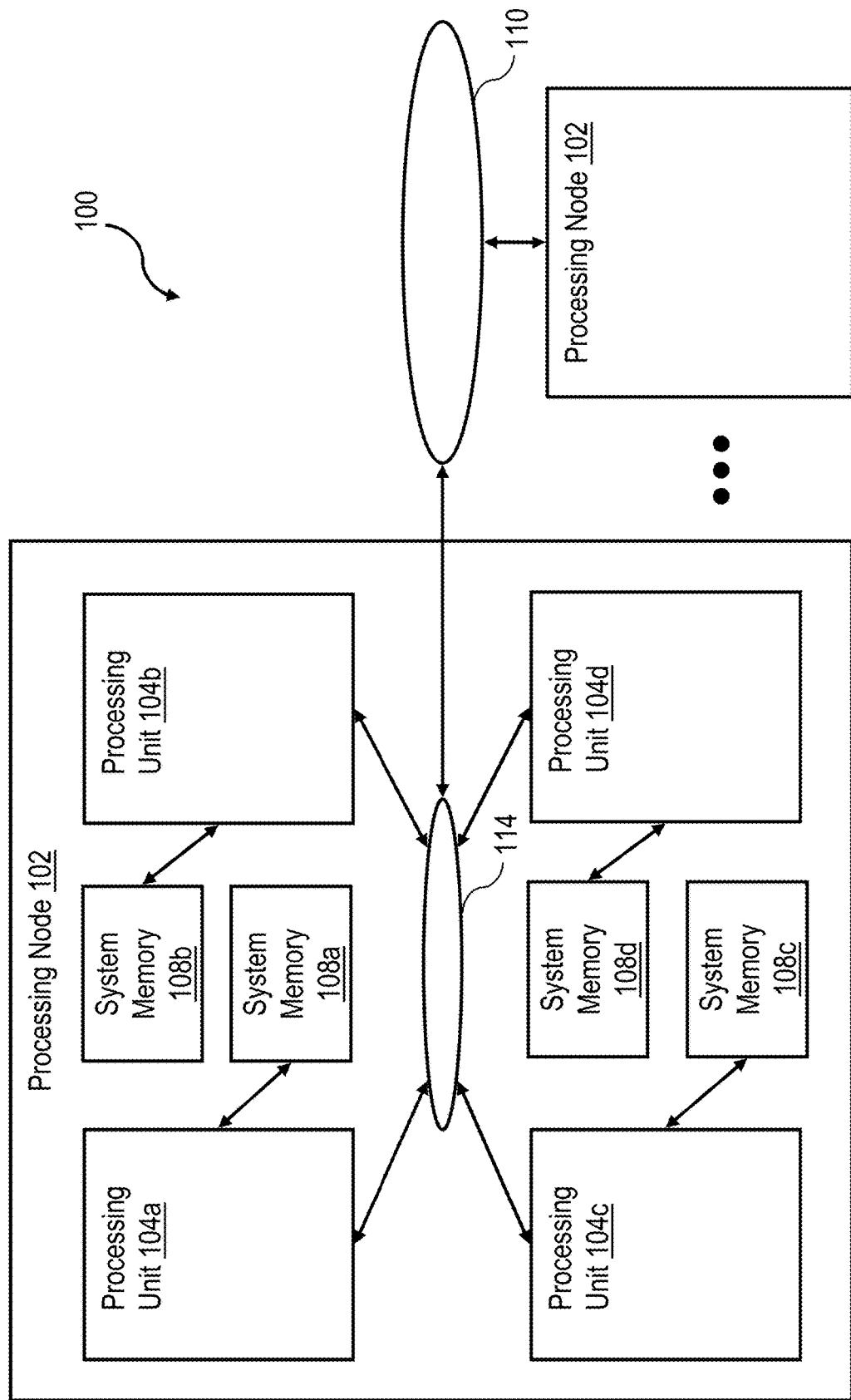
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high level block diagram depicting an exemplary data processing system 100 in accordance with one embodiment. In the depicted embodiment, data processing system 100 is a cache coherent symmetric multiprocessor (SMP) data processing system including multiple processing nodes 102 for processing data and instructions. Processing nodes 102 are coupled to a system interconnect 110 for conveying address, data and control information. System interconnect 110 may be implemented, for example, as a bused interconnect, a switched interconnect, or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form an interconnect fabric of data processing system 100.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached, and modified by a processor core 200 (see, e.g., FIGS. 2-3) in any processing unit 104 of any processing node 102 within data processing system 100. System memories 108 thus form the lowest level of memory storage in the distributed shared memory system of data processing system 100. In alternative embodiments, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to data processing systems of diverse architectures and are in no way limited to the generalized data processing system architecture illustrated in FIG. 1.

Figure 2:
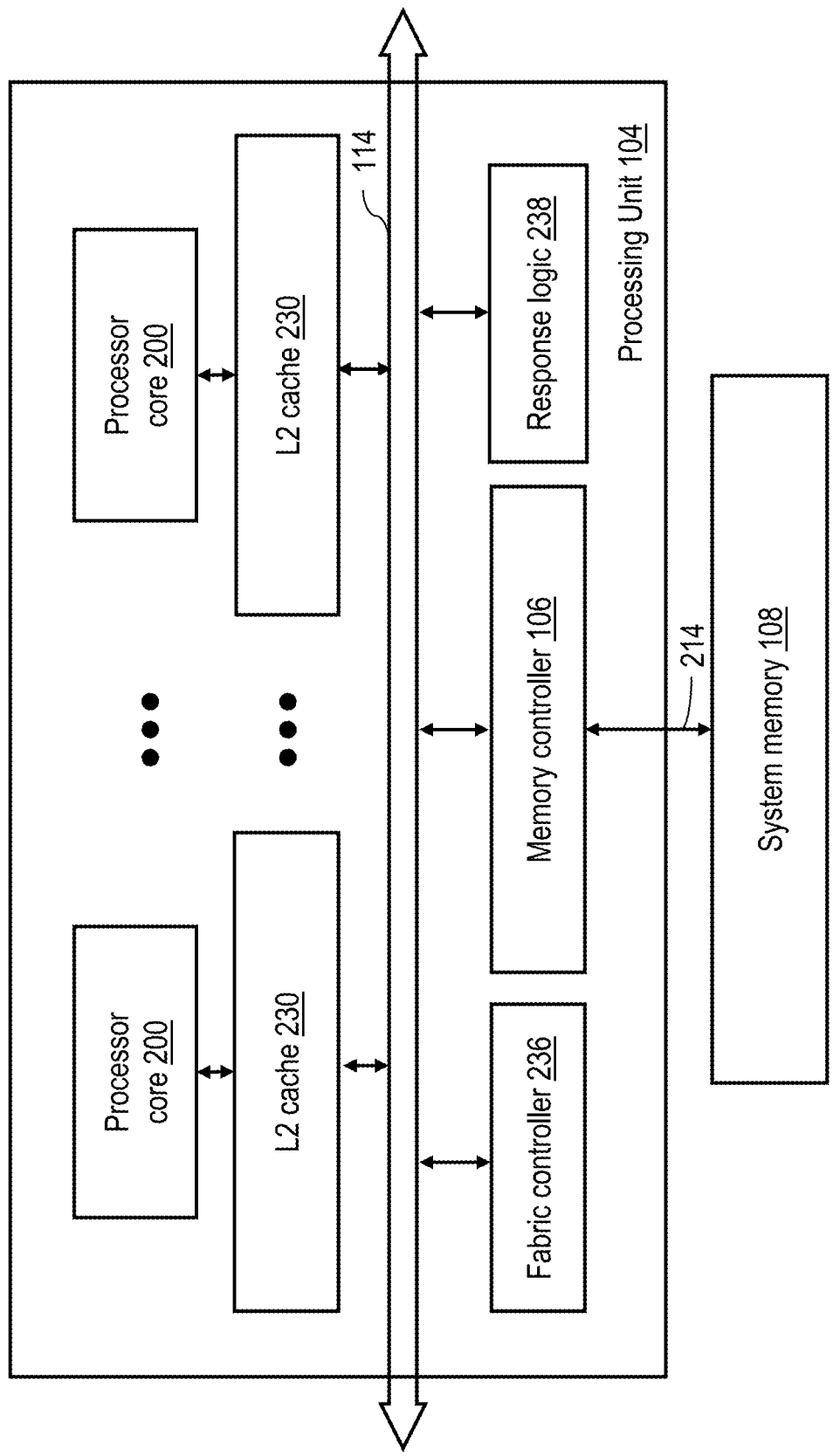
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the depicted embodiment, each processing unit 104 is an integrated circuit including one or more processor cores 200 for processing instructions and data. In a preferred embodiment, each processor core 200 supports simultaneous multithreading (SMT) and thus is capable of independently executing multiple hardware threads of execution simultaneously.

The operation of each processor core 200 is supported by a multi-level memory hierarchy having at its lowest level the shared system memories 108 accessed via integrated memory controllers 106. Each system memory 108 is coupled to its associated memory controller 106 via a communication link 214, including, for example, a request channel, a data channel, and a response channel. At its upper levels, the multi-level memory hierarchy of processor cores 200 includes one or more levels of cache memory, which in the illustrative embodiment include a store-through level one (L1) cache 302 (see, e.g., FIG. 3) within and private to each processor core 200, and a respective store-in level two (L2) cache 230 for each processor core 200. Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

Each processing unit 104 further includes an integrated and distributed fabric controller 236 responsible for controlling the flow of operations on the interconnect fabric comprising local interconnect 114 and system interconnect 110 and for implementing the coherency communication required to implement the selected cache coherency protocol. Processing unit 104 further includes an instance of response logic 238, which computes and broadcasts on the interconnect fabric, for each request, a "combined response" representing the systemwide coherence response for the request.

Figure 3:
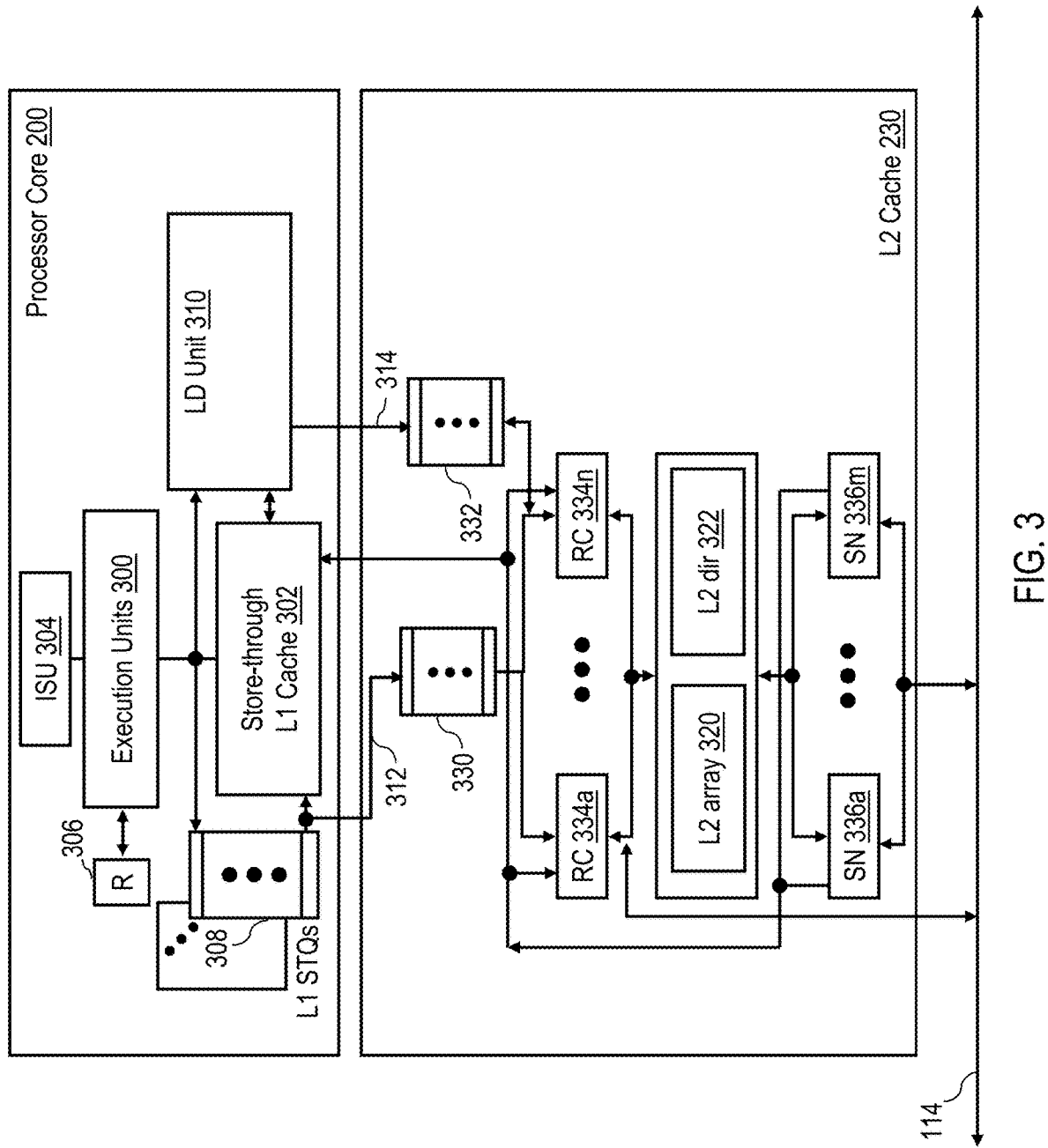
FIG. 3 is a more detailed block diagram of a processor core having a store-through upper level cache memory and store-in lower level cache memory in accordance with one embodiment.

With reference now to FIG. 3, there is illustrated a more detailed block diagram of an exemplary embodiment of a processor core 200 and its associated L2 cache 230 in accordance with one embodiment. In the illustrated embodiment, processor core 200 includes one or more execution unit(s) 300, which execute instructions from multiple simultaneous hardware threads of execution. The instructions can include, for example, arithmetic instructions, logical instructions, memory referent instructions (e.g., loads and stores), and barrier instructions. Execution unit(s) 300 can generally execute instructions of a hardware thread in any order as long as data dependencies and explicit orderings mandated by synchronization (barrier) instructions are observed. Instructions are fetched from the memory hierarchy and dispatched to execution units 300 for execution by an instruction sequencing unit (ISU) 304. Data obtained from the distributed shared memory system by load accesses are buffered in one or more register files (RFs) 306, and data updated by store accesses are written to the distributed shared memory system from the one or more register files 306.

Processor core 200 also includes N per-thread L1 store queues 308, each of which temporarily buffers store and synchronization (barrier) requests generated by execution of corresponding store and synchronization instructions by execution unit(s) 300. Because L1 cache 302 is a store-through cache, meaning that coherence is fully determined at a lower level of cache hierarchy (e.g., at L2 cache 230), store and barrier requests flow through L1 STQs 308 and then pass via store bus 312 to L2 cache 230 for processing. Processor core 200 additionally includes a load unit 310 that temporarily buffers load requests that miss in L1 cache 302. Load unit 310 is coupled to L2 cache 230 by a load bus 314.

Still referring to FIG. 3, L2 cache 230 includes a L2 cache array 320 and a L2 directory 322 of the contents of cache array 320. Assuming L2 cache array 320 and L2 directory 322 are set associative as is conventional, storage locations in system memories 108 are mapped to particular congruence classes within cache array 320 utilizing predetermined index bits within the system memory (real) addresses. The particular memory blocks stored within the cache lines of L2 cache array 320 are recorded in L2 directory 322, which contains one directory entry for each cache line in L2 cache array 320. While not expressly depicted in FIG. 3, it will be understood by those skilled in the art that each directory entry in cache directory 322 includes various fields, for example, a tag field that identifies the real address of the memory block held in the corresponding cache line of L2 cache array 320, a state field that indicates the coherence state of the cache line, a replacement order (e.g., Least Recently Used (LRU)) field indicating a replacement order for the cache line with respect to other cache lines in the same congruence class, and inclusivity bits indicating whether the memory block is held in the associated L1 cache 302.

L2 cache 230 includes an L2 store queue (STQ) 330 that receives storage-modifying requests and synchronization requests from L1 STQ 304 via store bus 312 and buffers such requests. L2 cache 230 similarly includes a L2 load queue (LDQ) 332 that receives load requests from load unit 310 via load bus 314 and buffers such requests. In order to service the requests buffered in L2 STQ 330 and L2 LDQ 332, L2 cache 230 implements multiple Read-Claim (RC) machines 334a-334n, which are each capable of independently and concurrently servicing a request dispatched from one of queues 330-332. In order to service remote requests originating from processor cores 200 other than the affiliated processor core 200, L2 cache 230 also includes multiple L2 snoop (SN) machines 336a-336m. Each snoop machine 336 can independently and concurrently handle a remote request snooped from local interconnect 114. As will be appreciated, the servicing of memory access requests by RC machines 334 may require the replacement or invalidation of memory blocks within cache array 320 (and L1 cache 302). Accordingly, L2 cache 230 may also additionally include unillustrated CO (castout) machines that manage the removal and writeback of memory blocks from cache array 320.

In the exemplary data processing system 100 of FIGS. 1-3, an interconnect operation begins when a master (e.g., a read-claim (RC) machine 334 of an L2 cache 230) broadcasts a request on the interconnect fabric comprising interconnects 110, 114. The request preferably includes at least a transaction type indicating a type of desired access and a resource identifier (e.g., target real address) indicating a resource to be accessed by the request. Common types of requests include those set forth below in Table I.

TABLE I

| Request | Description |
| --- | --- |
| CASTOUT | Copies the image of a memory block from a higher level of memory to a lower level of memory in preparation for the destruction of the higher level copy |
| DCLAIM (Data Claim) | Requests authority to promote an existing read-only copy of a memory block to a unique copy with write authority and with the intent to update (modify) it, invalidating any other cached copies of the memory block |

TABLE I-continued

| Request | Description |
| --- | --- |
| DCBZ (Data Cache Block Zero) | Requests authority to create, in cache, a new unique copy of a memory block with write authority containing all zeros, invalidating any other cached copies of the memory block |
| READ | Requests a copy of the image of a memory block with read permission |
| RWITM (Read-With-Intent-To-Modify) | Requests a unique copy of the image of a memory block with write authority to update (modify) it, invalidating any other cached copies of the memory block |
| WRITE | Requests authority to write a new unique copy of a memory block to main memory and invalidate any other cached copies of the memory block |

The request is received (snooped) via the interconnect fabric by coherence participants (e.g., L2 caches 230 and memory controllers 106) distributed throughout data processing system 100. In general, with some exceptions L2 SN machines 336 in the same L2 cache 230 as the master of a request do not snoop the request (i.e., there is generally no self-snooping) because a request is transmitted on the interconnect fabric only if the request cannot be serviced internally by a processing unit 104. Snoopers that receive and process requests may each provide a respective partial response (Presp) representing the response of at least that snooper to the request. A memory controller 106 determines the partial response to provide based, for example, upon whether the memory controller 106 is responsible for the request address and whether it has resources (e.g., an instance of snoop logic) available to service the request. An L2 cache 230 may determine its partial response based on, for example, the availability of a L2 SN machine 336 to handle the request, the availability of its L2 directory 322, and the coherence state associated with the target real address in L2 directory 322.

The partial responses of various snoopers are logically combined either in stages or all at once by one or more instances of response logic 238 to determine a system-wide combined response (Cresp) to the request. In one embodiment, which is assumed hereinafter, the instance of response logic 238 responsible for generating the combined response is located in the processing unit 104 containing the master that issued that request. Response logic 238 provides the combined response to the master and snoopers via the interconnect fabric to indicate the system-wide coherence response (e.g., success, failure, retry, etc.) for the request. If the combined response indicates success of the request, the combined response may indicate, for example, a data source for a target memory block of the request, a coherence state in which the target memory block is to be cached by the master (or other caches), and whether "cleanup" operations invalidating the requested memory block in one or more caches are required.

In response to receipt of the combined response, one or more of the master and snoopers typically perform one or more additional actions in order to service the request. These additional actions may include supplying data to the master, invalidating or otherwise updating the coherence state of data cached in one or more L1 caches 302 and/or L2 caches 230, performing castout operations, writing back data to a system memory 108, etc. If required by the request, a requested or target memory block may be transmitted to or from the master before or after the generation of the combined response by response logic 238.

The partial response of a snooper to a request and the actions performed by the snooper in response to the request and/or its combined response may be described with reference to whether that snooper is a Highest Point of Coherency (HPC), a Lowest Point of Coherency (LPC), or neither with respect to the request (target) address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1-3, the LPC will be the memory controller 106 for the system memory 108 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1-3, the HPC, if any, will be a particular L2 cache 230. Although other indicators may be utilized to designate an HPC for a memory block, a preferred embodiment of the present invention designates the HPC, if any, for a memory block utilizing selected cache coherence state(s) within the L2 directory 322 of an L2 cache 230.

The HPC, if any, for a memory block referenced in a request, or in the absence of an HPC, the LPC of the memory block, preferably has the responsibility of protecting the transfer of coherence ownership of a memory block, if necessary, in response to a request. This protective function can be performed by providing retry (RTY) partial responses to other requests specifying the same target address until the coherence ownership of the target memory block is transferred.

In data processing system 100, program execution may be distributed across multiple concurrent executing hardware threads in one or more processor cores 200. To permit program execution to be parallelized across available hardware thread resources with minimum dependencies (and thus maximum throughput), data processing system 100 preferably implements a weak memory model in which memory referent instructions, such as loads and stores, can be executed with a great deal of reordering as long as data and address dependencies and any explicit instruction orderings are observed. In such a system, memory updates made by storage modifying operations are generally permitted to affect other processors in a non-atomic fashion (i.e., stores may take effect at various processor cores at different points in time).

FIGS. 4A-4D depict four instruction sequences illustrating various possible types of intra-thread address dependencies that must be observed in a weak memory model to ensure program correctness. These intra-thread data dependencies include a load-to-load dependency (FIG. 4A), a load-to-store dependency (FIG. 4B), a store-to-load dependency (FIG. 4C), and a store-to-store dependency (FIG. 4D). In FIG. 4A, instruction sequence 400 includes a first load instruction 402 that precedes second load instruction 404 in program order. Because both first load instruction 402 and second load instruction 404 target an overlapping set of memory locations identified by address A, observance of intra-thread address dependency requires first load instruction 402 to be "completed" prior to issuance to the memory system of a load request corresponding to second load instruction 404, where "completion" for a load instruction in this context refers to the data requested by the load being returned to register files 306. While the requirement to maintain order between operations in this and the other examples in FIGS. 4A-4D is only applied to accesses with overlapping memory locations, those skilled in the art will recognize that at certain points within the various structures within processing unit 104, such as at L2 cache 230, the target addresses of memory accesses may only be tracked to a cache line address, and therefore these ordering requirements are sometimes pessimistically enforced to a cache line boundary.

FIG. 4B similarly depicts an instruction sequence 410 in which a load instruction 412 precedes a store instruction 414 in program order. Because both load instruction 412 and store instruction 414 target an overlapping set of memory locations identified by address A, observance of intra-thread address dependency requires load instruction 412 to be "completed" (i.e., the load data to be returned) prior to issuance to the memory system of a store request corresponding to store instruction 414.

FIG. 4C illustrates an instruction sequence 420 in which a store instruction 422 precedes a load instruction 424 in program order. Because both store instruction 422 and load instruction 424 target an overlapping set of memory locations identified by address A, observance of intra-thread address dependency requires store instruction 422 to be "completed" and then have its store data propagated to all other processing units such that they will read no value for address A earlier in time than this store, prior to issuance to the memory system of a load request corresponding to load instruction 424. In this context, "completion" of store instruction 422 refers to the store being executed by execution unit 300 and being placed into L1 STQ 308 for the executing thread.

FIG. 4D depicts an instruction sequence 430 in which a first store instruction 432 precedes a second store instruction 434 in program order. Because both store instructions 432-434 target an overlapping set of memory locations identified by address A, observance of intra-thread address dependency requires (1) store instruction 432 to be "completed" (i.e., executed and placed in L1 STQ 308 for the executing thread) prior to issuance to the memory system of a store request corresponding to store instruction 434 and (2) store requests to remain in order as they propagate throughout the system.

As alluded to above, in weakly-ordered memory systems, in certain circumstances a programmer may desire to enforce ordering and atomicity of operations not automatically provided by the weak memory model through the inclusion of explicit "synchronization" or "barrier" instructions. A barrier instruction forces various load and store instructions preceding and following the barrier instruction in a given hardware thread of execution to be performed in program order (in-order) relative to the barrier instruction and to possibly restore the atomicity of stores (depending on barrier type) under certain circumstances. Barrier performance is generally a critical component of the overall performance of weak memory model machines and, as such, it is desirable to ensure that barriers execute in an efficient manner. However, achieving store atomicity can often require that a barrier executed by one thread cause operations performed by another thread to be propagated in a specific order to restore atomicity.

With reference to FIGS. 5A-5D, four instruction sequences are given that illustrate the use of explicit barrier instructions to enforce intra-thread load-to-load ordering (FIG. 5A), load-to-store ordering (FIG. 5B), store-to-load ordering (FIG. 5C), and store-to-store ordering (FIG. 5D) in a given hardware thread of execution in a processor core 200 of a data processing system 100 implementing a weak memory model. An explicit barrier instruction is required because the instructions ordered by the barrier instructions target different addresses (i.e., addresses A and B) and therefore will not be automatically ordered by the address dependencies described above with reference to FIGS. 4A-4D. A given barrier instruction may enforce only a subset of these four ordering cases.

In FIG. 5A, instruction sequence 500 includes a first load instruction 502 that precedes second load instruction 506 in program order. An intervening barrier instruction 504 enforces in-order processing of first load instruction 502 and second load instruction 506 relative to each other and relative to barrier instruction 504. Accordingly, first load instruction 502 must be "completed" (i.e., the load data must be returned to register file 306) prior to issuance to the L1 STQ 308 of a barrier request corresponding to barrier instruction 504, and issuance to the memory system of a load request corresponding to load instruction 506 must wait until after the barrier request has "completed." In this load-to-load ordering context, "completion" of the barrier request entails the execution of barrier instruction 504 at execution unit 300 and a barrier operation being issued to L1 STQ 308. The barrier need provide no additional ordering in this case as prior load instruction 502 is already complete and the delay in issuing the subsequent load instruction 506 until prior load instruction 502 is complete is itself sufficient to maintain the ordering required by barrier instruction 504. However, if the barrier instruction 504 is enforcing the load-to-load ordering among other orderings, enforcement of all the orderings by barrier instruction 504 can require placing a corresponding barrier request in L1 STQ 308. For simplicity, it is assumed herein that all barrier requests are placed in L1 STQ 308 and are processed as applicable in L2 cache 230.

FIG. 5B similarly depicts an instruction sequence 510 in which a load instruction 512 precedes a store instruction 516 in program order. An intervening barrier instruction 514 enforces in-order processing of load instruction 512 and store instruction 516 relative to each other and relative to barrier instruction 514. Accordingly, load instruction 512 must be "completed" (i.e., the load data must be returned to register file 306) prior to issuance to the memory system of a barrier request corresponding to barrier instruction 514, and issuance of a store request corresponding to store instruction 516 to the memory system must wait until after the barrier request has "completed." As with the load-to-load ordering case, barrier instruction 514 is "complete" in this case when barrier instruction 514 is executed at execution unit 300 and a barrier operation is issued to L1 STQ 308. The delay in issuing subsequent store instruction 516 until prior load instruction 512 is completed is sufficient to enforce the ordering required by barrier instruction 514, and no additional ordering must be enforced in this case by barrier instruction 514 itself.

FIG. 5C illustrates an instruction sequence 520 in which a store instruction 522 precedes a load instruction 526 in program order. An intervening barrier instruction 524 enforces in-order processing of store instruction 522 and load instruction 526 relative to each other and relative to barrier instruction 524. Accordingly, store instruction 522 must be "completed" (i.e., executed at execution unit 300) prior to issuance to the memory system of a barrier request corresponding to barrier instruction 524, and issuance of a load request corresponding to load instruction 526 to the memory system must wait until after the barrier request has "completed." In this store-to-load ordering context, "completed" for a barrier request means that the storage update made by prior store instruction 522 has fully propagated throughout the system such that no hardware thread may read an earlier value in the coherence order for the memory locations modified by prior store instruction 522. This type of barrier request that fully propagates store updates before completing is known as a "blocking" barrier. The completion of the propagation of the storage update of prior store instruction 522 is signaled by the receipt at the execution unit 300 of an acknowledgement from the barrier request (see, e.g., block 866 of FIG. 8B).

FIG. 5D depicts an instruction sequence 530 in which a first store instruction 532 precedes a second store instruction 536 in program order. Intervening barrier instruction 534 enforces in-order processing of first store instruction 532 and second store instruction 536 relative to each other and relative to barrier instruction 534 in one of two ways. Accordingly, store instruction 532 must be "completed" (i.e., executed at execution unit 300 and placed in L1 STQ 308) prior to issuance to the memory system of a barrier request corresponding to barrier instruction 534, and issuance of a store request corresponding to store instruction 536 to the memory system must wait until after the barrier request has "completed." In a first case in which the barrier request is a "blocking" barrier, completion of the barrier request in the store-to-store ordering case entails ensuring that the store request and its effects have fully propagated throughout the system such that no thread may read an earlier value in the coherence order for the memory locations modified by prior store instruction 532. In a second case, completion of the barrier request occurs when barrier instruction 534 is executed at execution unit 300 and placed in L1 STQ 308, with the further guarantee that the barrier request will subsequently ensure that the stores requests corresponding to store instructions 532 and 536 are propagated to other processors in the order implied by barrier instruction 534.

Figure 6A:
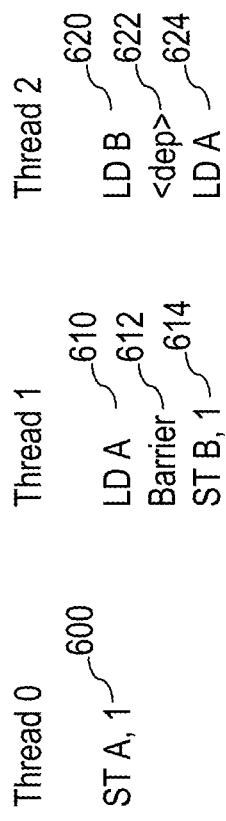
FIG. 6A is an exemplary multi-threaded program that preserves A-cumulativity through the use of a barrier.

Referring now to FIG. 6A, a portion of a multi-threaded program executed by three hardware threads (thread 0, thread 1, and thread 2) is provided to illustrate a property of barriers referred to as A-cumulativity. In the multi-threaded program of FIG. 6A (and similarly in FIG. 6B discussed below), it is assumed that threads 0 and 1 execute within data processing system 100 on the same processor core 200 (thereby sharing an L1 cache 302), and thread 2 executes on a different processor core 200 and therefore accesses a different L1 cache 230. In the multi-threaded programs of FIGS. 6A-6B, it is also assumed that all storage locations accessed by the multi-threaded program (e.g., addresses A and B) start with an initial value of '0'.

In the multi-threaded program of FIG. 6A, thread 0 executes a store instruction 600 that updates address A from the initial value of '0' to a value of '1'. Thread 1 then executes a load instruction 610 that loads the value from address A. Load instruction 610 is followed by a barrier instruction 612 that causes load instruction 610 to be processed in-order with respect to both barrier instruction 612 and a subsequent store instruction 614, which stores the value of '1' to address B. Thread 2 then executes a load instruction 620, which loads the value from address B. Load instruction 620 is followed by one or more instructions represented by "<dep>" 622 that create a data dependency that requires load instruction 620 to be processed in-order with respect to load instruction 624, which loads the value of address A. This data dependency can be created, for example, by utilizing the value returned by load instruction 620 to form the target address A of subsequent load instruction 624.

Because threads 0 and 1 execute on a single processor core and thus share a store-through L1 cache 230, thread 1 may execute load instruction 610 to read the value '1' stored into the shared L1 cache 230 by thread 0 through execution of store instruction 600 before that update to address A has propagated to thread 2, which executes on a different processor core 200. The barrier imposed by barrier instruction 612 on thread 1 is A-cumulative, where A-cumulativity requires that any stores by other threads that are visible to the thread executing the barrier must also be propagated by the barrier ahead of any stores that occur in the thread after the barrier instruction. Barrier instruction 612 in thread 1 thus ensures that the update to address A made by store instruction 600 becomes visible to any given processor core (in this case the processor core that executes thread 2) before the store to address B made by store instruction 614 becomes visible to the processor core executing thread 2. In conventional implementations, this ordering is achieved by having barrier requests from a given processor core 200 force all older store requests, regardless of the hardware thread that executed the store requests, through the L2 STQ 330 of an associated L2 cache before any store request from that processor core 200 that are younger than the barrier request. This ordering partially restores the appearance of store atomicity via a property referred to herein as A-cumulativity. Unfortunately, this cross-thread ordering is generally required in prior art system whether or not the thread executing the barrier instruction has actually read from storage locations updated by other cross-thread store requests. In the absence of a read that establishes the visibility of a cross-thread store request to the thread executing the barrier instruction, it is not strictly necessary to propagate the other thread's store request ahead of the barrier. While the conventional implementation is relatively simple to realize, the conventional implementation can cause performance delays for a given barrier, which may have to wait for many stores in the STQ that are not architecturally required to be ordered by the barrier.

Execution of the exemplary program in FIG. 6A also illustrates the property of causality in a multiprocessor data processing system. As used herein causality, which is a desirable property in multi-threaded programs, is defined as being preserved if, during execution of a multiprocessor program, a given hardware thread of execution cannot read the effects (e.g., the load of B in thread 2) of a computation before the storage updates that caused the computation (e.g., the store to A by thread 0) can be read by the given thread. Thus, if store instruction 614 executes on thread 1 and the associated memory update propagates to thread 2 before the memory update of store instruction 600 propagates to thread 2, causality would be violated because the store of the value of '1' to address B, which is an effect of the store to address A, would be visible to thread 2 before the memory update associated with store 600 was visible to thread 2.

To guarantee causality in a weak memory model system, barrier instruction 612 is implemented such that store instruction 614 does not take effect or begin propagating its memory update to other processor cores 200 until load instruction 610 has bound to its value. In addition, barrier instruction 612 also ensures that the memory update specified by store instruction 600 propagates to thread 2 before the memory update associated with store instruction 614. Thus, causality is preserved because the cause of the computation (i.e., the memory update of store instruction 600) is visible to thread 2 before the result of the computation (i.e., the memory update caused by store instruction 614). The data dependency formed by instruction(s) 222 is also enforced by thread 2 to ensure that thread 2 executes load instructions 620 and 624 and binds their values in program order to guarantee that the thread 2 properly observes the memory updates made by the thread 0 and the thread 1.

Figure 6B:
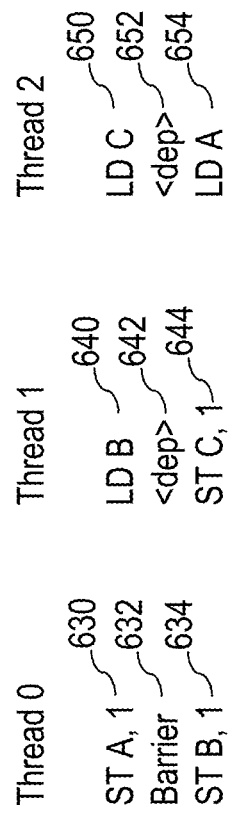
FIG. 6B is an exemplary multi-threaded program that preserves B-cumulativity through the use of a barrier.

With reference to FIG. 6B, a different multi-threaded program, executed by threads 0-2 is provided to illustrate another property of barriers referred to as B-cumulativity. In FIG. 6B, thread 0 executes in-order a store instruction 630 that writes a value of '1' to address A in the distributed shared memory system, a barrier instruction 632, and a store instruction 634 that writes a value of '1' to address B in the distributed shared memory system. Thread 1 executes a load instruction 640 that reads a value at address B, one or more instructions 642 forming a data dependency (denoted by <dep>), and a store instruction 644 that writes a value of '1' to address C. Thread 2 executes a load instruction 650 that reads a value at address C, one or more instructions 652 forming a data dependency (denoted by <dep>), and a load instruction 654 that reads a value at address A.

In the multi-threaded program of FIG. 6B, the B-cumulativity property of barrier instruction 632 ensures that the storage update made by store instruction 630 propagates to any given processor core 200 before any storage update (in this case, the storage update caused by store instruction 634) that occurs after a load that has read from any storage update ordered after the barrier (in this case, the storage update caused by store instruction 634). B-cumulativity is extended recursively through as many hardware threads as are applicable (by virtue of reading some store ordered after the barrier or ordered after a load that has read from a store previously ordered after the barrier). Therefore, barrier instruction 632 executed by thread 0 ensures that the storage update made by store instruction 634 to address B and the storage update made by store instruction 644 to address C will occur at all processor cores 200 after the storage update made by store instruction 630 to address A has completed. This ordering ensures that the thread 2 will read the new value of '1' at address A if thread 1 reads the value of '1' at address B.

As discussed above, each processor core 200 of data processing system 100 implements a store-through L1 cache 302 that is shared by multiple hardware threads of the processor core 200, meaning that, absent some restriction, all hardware threads of the processor core 200 are permitted to immediately read back storage updates of any hardware thread made in the L1 cache 302. The visibility of these storage updates before the storage update have been serialized into the coherence order at the point of coherence (e.g., L2 cache 230) creates certain obligations on the design to maintain both cumulativity (both A- and B-cumulativity) and coherence, which is defined herein as the requirement that, for a given storage location in memory, all hardware threads view any updates to that storage location in the same order. (Coherence does not require all hardware threads to have visibility to all storage updates, but whatever subset of storage updates are visible to a given hardware threads must be consistent with the overall coherence order.)

In the prior art, coherence and cumulativity have been maintained through the implementation of elaborate rules for processing memory referent instructions and associated memory access requests in the processor cores and the lower level caches. In particular, the maintenance of coherence and cumulativity among other memory model constraints in such systems typically required that barriers and same address ordering between memory accesses were implemented across all hardware threads at the point of coherency (e.g., in the L2 cache). This implementation means a barrier or a memory access for a given hardware thread can be delayed by prior memory accesses or barriers of any hardware thread in the same processor core, including cases where the threads are unrelated and, for barriers, are accessing different memory locations. Such delays can significantly impede the performance of barriers and same address accesses. The present disclosure recognizes that the maintenance of coherence and the processing of barrier requests can be greatly simplified by, among other things, selectively preventing pre-coherence point reads to the shared upper level store-through cache. If pre-coherence point reads by other hardware threads are prevented when a store from a given thread is in process between the processor core and the point of coherence, much of the need to implement barrier and same-address ordering across hardware threads is avoided and, with aggressive load forwarding, can essentially be eliminated. However, where possible, it is still desirable to allow pre-coherence point reads from the L1 cache across all hardware threads in those circumstances where these read accesses do not induce avoidable ordering obligations across hardware threads. As such, the present disclosure attempts to return the L1 cache to a state that is readable across hardware threads when a cache line is re-populated in the L1 cache and only re-populates the L1 cache in instances where cross-thread reads are again permissible. Innovative techniques of processing memory referent and barrier instructions in a system having a shared upper level store-through cache will now be discussed in detail with reference to FIGS. 7A-7B (describing store processing in a processor core 200 and L2 cache 230), FIGS. 8A-8B (describing barrier processing in a processor core 200 and L2 cache 230), and FIGS. 9A-9C (describing load processing in a processor core 200 and L2 cache 230).

Figure 7A:
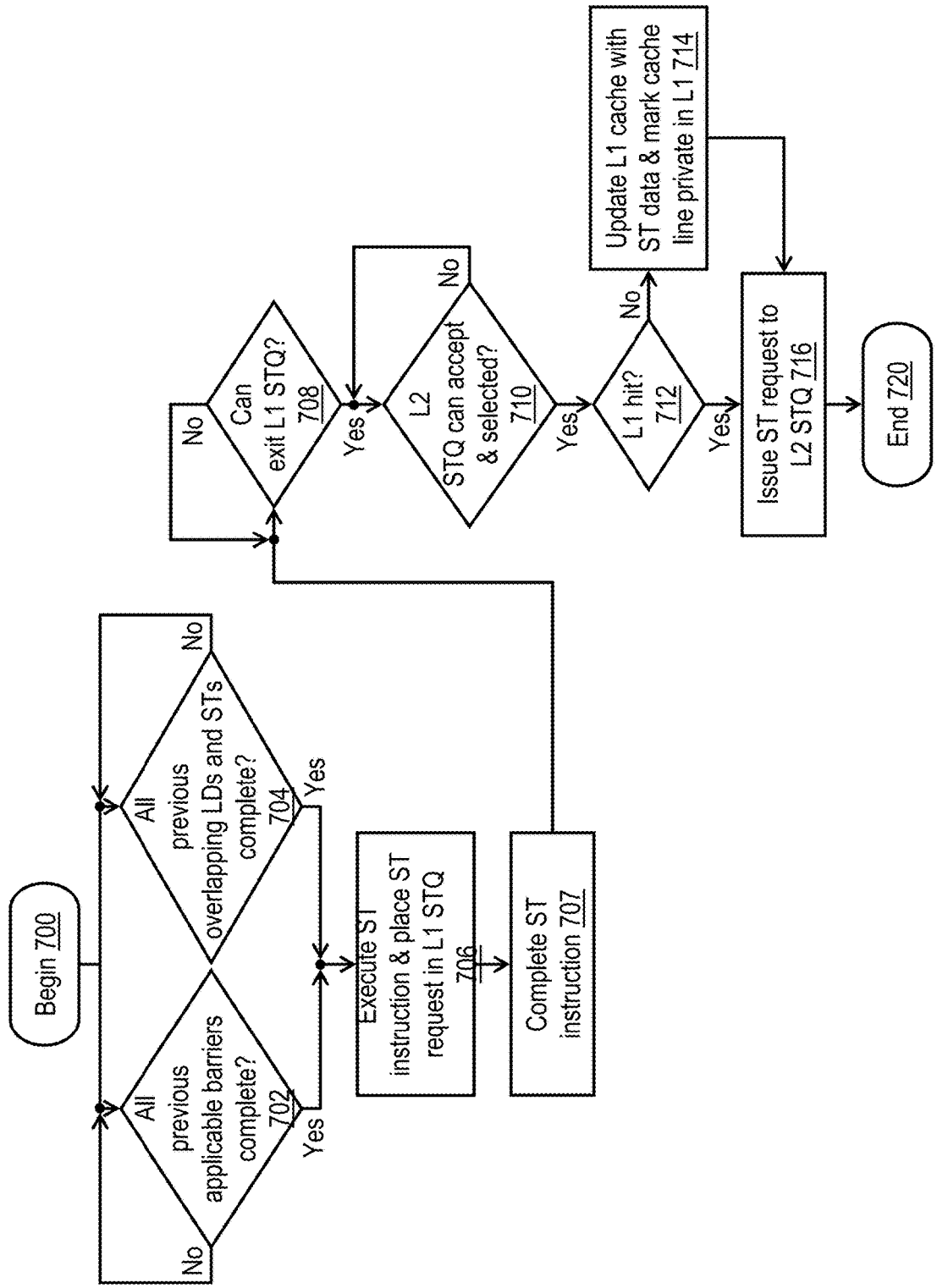
FIG. 7A is a high level logical flowchart of an exemplary method by which a processor core processes a store instruction in accordance with one embodiment.

With reference now to FIG. 7A, there is illustrated a high level logical flowchart of an exemplary method by which a processor core processes a store instruction in accordance with one embodiment. The illustrated process details the life cycle of an individual store instruction; thus, many such processes may be running concurrently in a given hardware thread as well as in multiple hardware threads of exemplary data processing system 100.

The process of FIG. 7A begins at block 700, for example, in response to ISU 304 of a processor core 200 fetching a storage-modifying instruction (referred to herein generally as a store instruction) from the shared distributed memory system for execution in a given hardware thread among multiple simultaneous hardware threads of execution. The process then proceeds in parallel to blocks 702-704, which illustrate two independent conditions precedent to executing the store instruction. In particular, processor core 200 will not release the store instruction for execution until: (1) all previous applicable barriers in the given hardware thread have completed (block 702), as discussed above with reference to FIGS. 5B and 5D and (2) all previous load and store instructions targeting overlapping memory locations to be modified by the store instruction (so-called "overlapping" loads and stores) have completed (block 704), as discussed above with reference to FIGS. 4B and 4D. Once both of these conditions precedent have been satisfied, the process of FIG. 7A proceeds to block 706.

Block 706 illustrates execution units 300 executing the store instruction and placing into the L1 STQ 308 of the relevant hardware thread a store request corresponding to the executed store instruction, where the store request includes at least a thread identifier (TID) of the hardware thread that executed the store instruction, a transaction type identifying type of request (i.e., a store), the calculated target address, and the store data to be stored into the shared distributed memory system at the target address. The store instruction is then completed at block 707. As indicated at blocks 708-710, the store request remains buffered in the L1 STQ 308 until the store request is permitted to be issued from L1 STQ 308 (typically when no overlapping store or applicable barrier instruction precedes the store in the same L1 STQ 308), is selected for issuance from L1 STQ 308 (e.g., by an arbiter that selects among requests ready for issuance from the various L1 STQs 308), and an entry for the store request is available in L2 STQ 330. Once these conditions are satisfied, processor core 200 determines at block 712 whether or not to update L1 cache 302 with the store data of the store request. In preferred embodiments, L1 cache 302 does not allocate on a L1 cache miss and thus is only updated by the store request if the target address of the store request hits in L1 cache 302, as indicated at block 712. In response to a determination at block 712 that the target address of the store request hits in L1 cache 302, L1 cache 302 updates the relevant cache line with the store data of the store request and marks the updated cache line as private to the hardware thread that executed the store instruction (block 714). As a result of this marking, the cache line is visible only to the indicated hardware thread and temporarily cannot be accessed in L1 cache 302 by any other hardware thread of the associated processor core 200 until reloaded from L2 cache 230. The private cache line will therefore appear as an L1 miss to other threads' memory accesses.

Following block 712 or block 714, the store request is issued from the L1 STQ 308 to L2 STQ 330, which orders the store request with other store and barrier requests of all of the hardware threads of processor core 200 (block 716). Thereafter, the process of FIG. 7A ends at block 720.

Figure 7B:
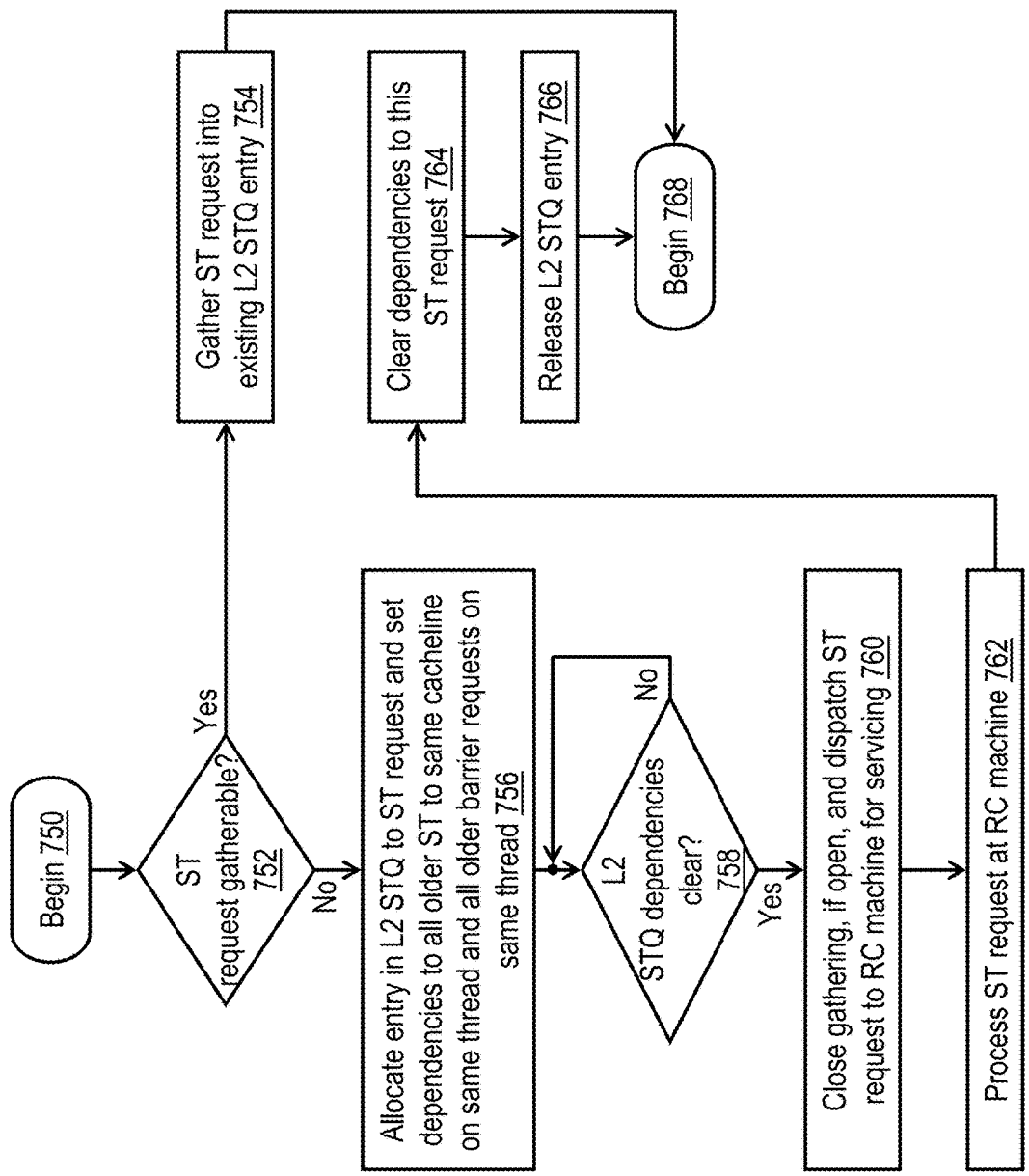
FIG. 7B is a high level logical flowchart of an exemplary method by which a lower level cache processes a store request in accordance with one embodiment.

Referring now FIG. 7B, there is depicted a high level logical flowchart of an exemplary method by which a lower level cache processes a store request in accordance with one embodiment. The illustrated process details the life cycle of an individual store request in an L2 cache 230; thus, many such processes may be running concurrently in a given L2 cache 230, as well as in multiple L2 caches 230 of exemplary data processing system 100.

The process of FIG. 7B begins at block 750, for example, in response to receipt by an L2 cache 230 of a store request issued from an L1 STQ 308 at block 716 of FIG. 7A. At block 752, L2 cache 230 determines whether or not the store request can be gathered with a previous store request residing in an existing entry associated with this thread in L2 STQ 330, for example, by determining whether an existing associated entry in L2 STQ 330 for which store gathering has not been closed buffers a previous store request that updates the same cache line as the newly received store request. In response to a determination at block 752 that the store request is gatherable into an existing entry in L2 STQ 330, L2 cache 230 gathers the store request into the existing entry of L2 STQ 330 by merging the store data of the store request with the store data of the store request in the existing entry in L2 STQ 330 (block 754). Thereafter, the storage update indicated by the newly received store request will be handled as part of the existing store request into which it was gathered. Accordingly, the process of FIG. 7B for the newly received store request terminates at block 768.

Returning to block 752, in response to a determination that the store request cannot be gathered, L2 cache 230 allocates a free entry in L2 STQ 330 to buffer the store request and creates dependencies for the store request to all older store and barrier requests in L2 STQ 330 that: (1) are from the same hardware thread and (2) for the older store requests, target the same target cache line. Those skilled in the art will appreciate that the set of dependencies created at block 756 is significantly smaller than those required by prior art systems, which typically must instead create dependencies for the store request to all older store requests to the same target cache line across all hardware threads and to all older barrier requests across all hardware threads. As indicated by block 758, the store request is not dispatchable until the set of dependencies, if any, created at block 756 is cleared by the processing of all of the relevant store and barrier requests by L2 cache 230.

Once all of the dependencies, if any, upon which dispatch of the store request depends are cleared, L2 STQ 330 closes gathering, if still open, for the entry and dispatches the store request to an available RC machine 334 of L2 cache 230 for processing (block 760). In response to receipt of the store request, the RC machine 334 processes the store request (block 762). For example, at block 762 RC machine 334 obtains, if necessary, a copy of the target cache line and/or authority to update the target cache line, updates the target cache line in L2 array 320, updates the entry in L2 directory 322 for the target cache line to a modified coherence state, and ensures any other cached copies of the target cache line are invalidated. L2 cache 230 then clears any dependencies established by subsequent store or barrier requests to the store request in L2 STQ 330 (block 764) and releases the entry in L2 STQ 330 buffering the store request, making the entry available for allocation to a next store or barrier request (block 766). Thereafter, the process of FIG. 7B ends at block 768.

Figure 8A:
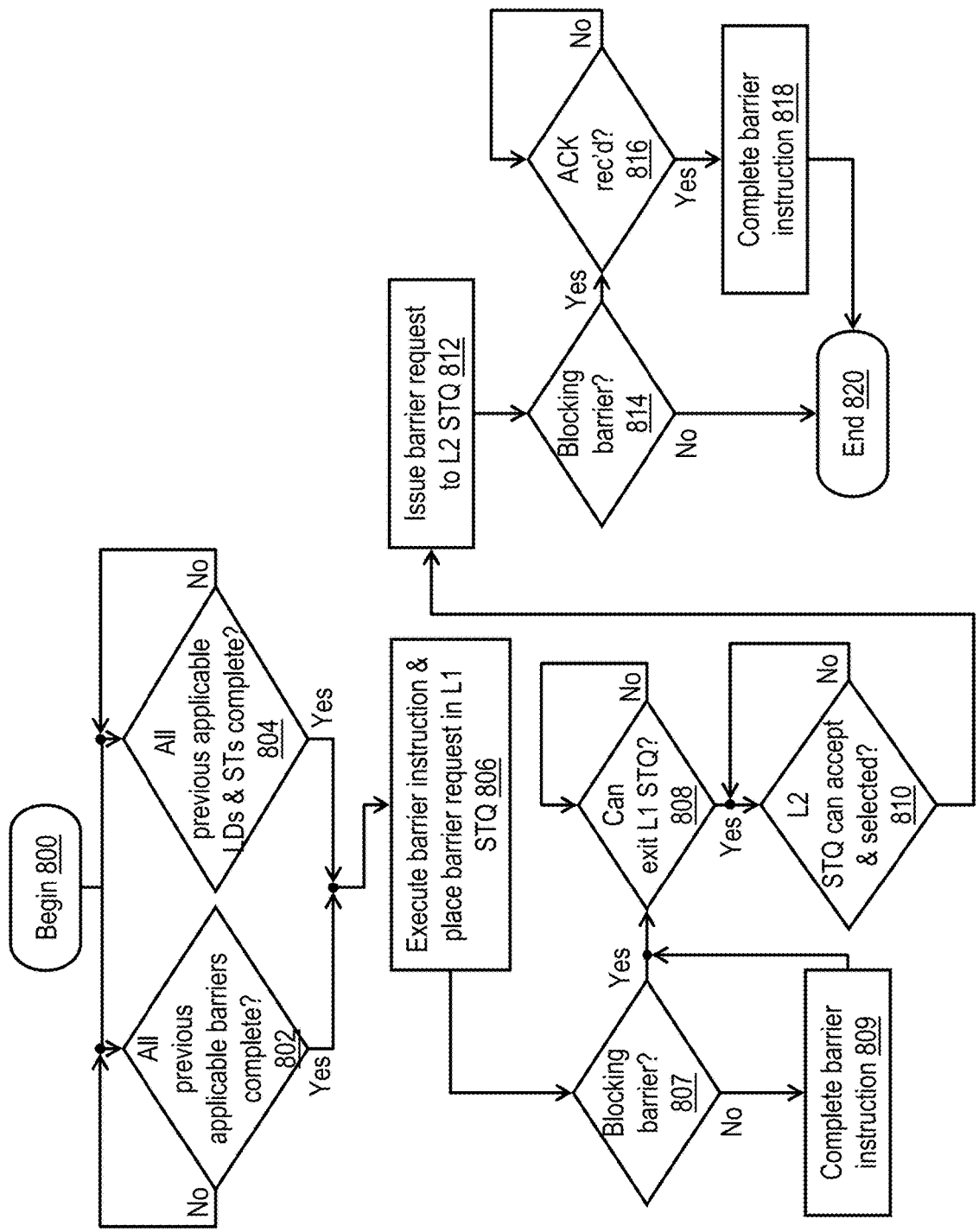
FIG. 8A is a high level logical flowchart of an exemplary method by which a processor core processes a barrier instruction in accordance with one embodiment.

With reference now to FIG. 8A, there is illustrated a high level logical flowchart of an exemplary method by which a processor core processes a barrier instruction in accordance with one embodiment. The illustrated process details the life cycle of an individual barrier instruction; thus, many such processes may be running concurrently in a given hardware thread, as well as in multiple hardware threads of exemplary data processing system 100.

The process of FIG. 8A begins at block 800, for example, in response to ISU 304 of a processor core 200 fetching a barrier instruction from the shared distributed memory system for execution in a given hardware thread among multiple simultaneous hardware threads of execution. The process then proceeds in parallel to blocks 802-804, which illustrate two independent conditions precedent to execution of the barrier instruction. In particular, processor core 200 will not release the barrier instruction for execution until: (1) all previous applicable barriers in the given hardware thread have completed (block 802) and (2) all previous load and store instructions in the same hardware thread have completed (block 804), as discussed above with reference to FIGS. 5A-5D. Once both of these conditions precedent have been satisfied, the process of FIG. 8A proceeds to block 806.

Block 806 illustrates execution units 300 executing the barrier instruction and placing into the L1 STQ 308 of the relevant hardware thread a barrier request corresponding to the executed barrier instruction, where the barrier request includes at least a thread identifier (TID) of the hardware thread that executed the barrier instruction and a transaction type identifying type of request (i.e., a barrier). Block 807-809 indicate that the barrier instruction is then completed if the barrier is not a blocking barrier, as discussed above with reference to FIGS. 5C-5D. Completing the barrier instruction allows the processor core 200 to execute subsequent memory referent and barrier instructions in the same hardware thread, as discussed at blocks 702, 802, and 902. As indicated at blocks 808-810, the barrier request remains buffered in the L1 STQ 308 until the barrier request is permitted to be issued from the L1 STQ 308 (typically when no store or applicable barrier request precedes the barrier request in the same L1 STQ 308), is selected for issuance from L1 STQ 308 (e.g., by an arbiter that selects among requests ready for issuance from the various L1 STQs 308), and an entry for the barrier request is available in L2 STQ 330. Once these conditions are satisfied, processor core 200 issues the store request from the L1 STQ 308 to L2 STQ 330, which orders the barrier request with other store and barrier requests of all of the hardware threads of processor core 200 (block 812).

At block 814, processor core 200 determines whether or not the barrier request specifies a blocking barrier. In response to a determination at block 814 that the barrier is not a blocking barrier, the process ends at block 820. If, however, processor core 200 determines that the barrier is a blocking barrier, the barrier instruction is completed at block 818 in response to processor core 200 receiving from L2 cache 230 an acknowledgment (ACK) that the corresponding barrier request has been processed and that all prior stores have fully propagated throughout the system (block 816). Following block 818, the process of FIG. 8A ends at block 820.

Figure 8B:
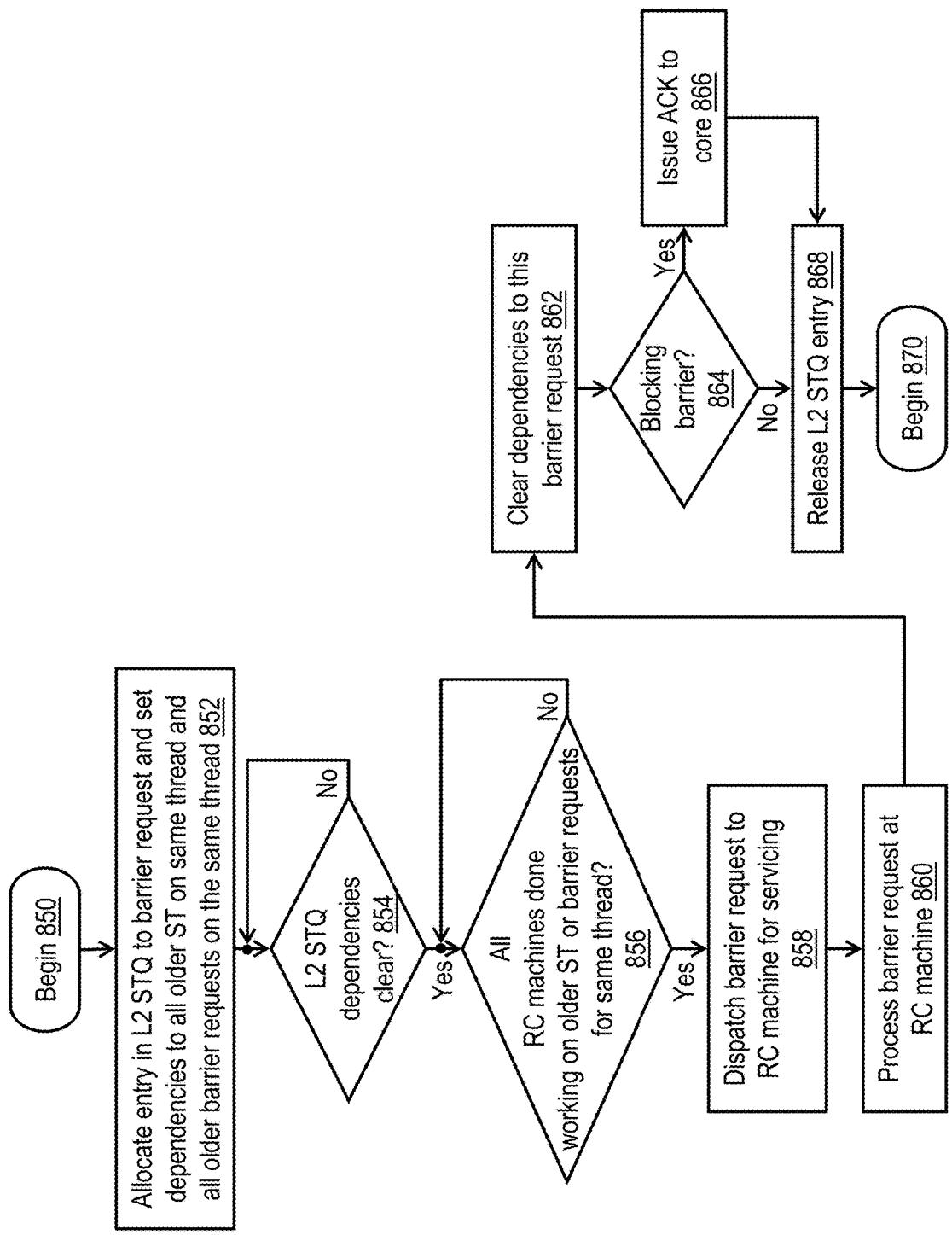
FIG. 8B is a high level logical flowchart of an exemplary method by which a lower level cache processes a barrier request in accordance with one embodiment.

Referring now to FIG. 8B, there is depicted a high level logical flowchart of an exemplary method by which a lower level cache processes a barrier request in accordance with one embodiment. The illustrated process details the life cycle of an individual barrier request in an L2 cache 230; thus, many such processes may be running concurrently in a given L2 cache 230, as well as in multiple L2 caches 230 of exemplary data processing system 100.

The process of FIG. 8B begins at block 850, for example, in response to receipt by an L2 cache 230 of a barrier request issued from an L1 STQ 308 at block 812 of FIG. 8A. At block 852, L2 cache 230 allocates a free entry in L2 STQ 330 to buffer the barrier request and creates dependencies for the barrier request to all older store and barrier requests of the same hardware thread that are buffered in L2 STQ 330. Those skilled in the art will appreciate that the set of dependencies created at block 852 is significantly smaller than those required by prior art systems that create dependencies for the barrier request to all older store and barrier requests across all hardware threads.

As indicated by blocks 854-856, the barrier request is not dispatchable from L2 STQ 330 until the set of dependencies, if any, created at block 852 are all cleared by the dispatch of the relevant prior store and barrier requests from L2 STQ 330 (block 854) and the completion of processing of these prior store and barrier requests by RC machines 334 (block 856). Once these conditions are satisfied, L2 cache 230 dispatches the barrier request from L2 STQ 330 to an available RC machine 334 of L2 cache 230 for processing (block 858). In response to receipt of the barrier request, the RC machine 334 processes the barrier request (block 860). For example, at block 860 RC machine 334 may iteratively broadcast the barrier request on the interconnect fabric of data processing system 100 until confirmation is received (e.g., via an appropriate combined response) that all other coherence participants in data processing system 100 have received and processed the barrier request to enforce ordering and/or propagation of memory access requests with reference to the barrier.

After processing of the barrier request completes, L2 cache 230 clears any dependencies of other requests in L2 STQ 330 to the barrier request (block 862) and, if the barrier request is a blocking barrier request, sends an acknowledgement (ACK) of completion of the barrier to the processor core 200 (blocks 864-866). Following block 864 or block 866, L2 cache 230 releases the entry in L2 STQ 330 buffering the barrier request, making the entry available for allocation to a next store or barrier request (block 868). Thereafter, the process of FIG. 8B ends at block 870.

Figure 9A:
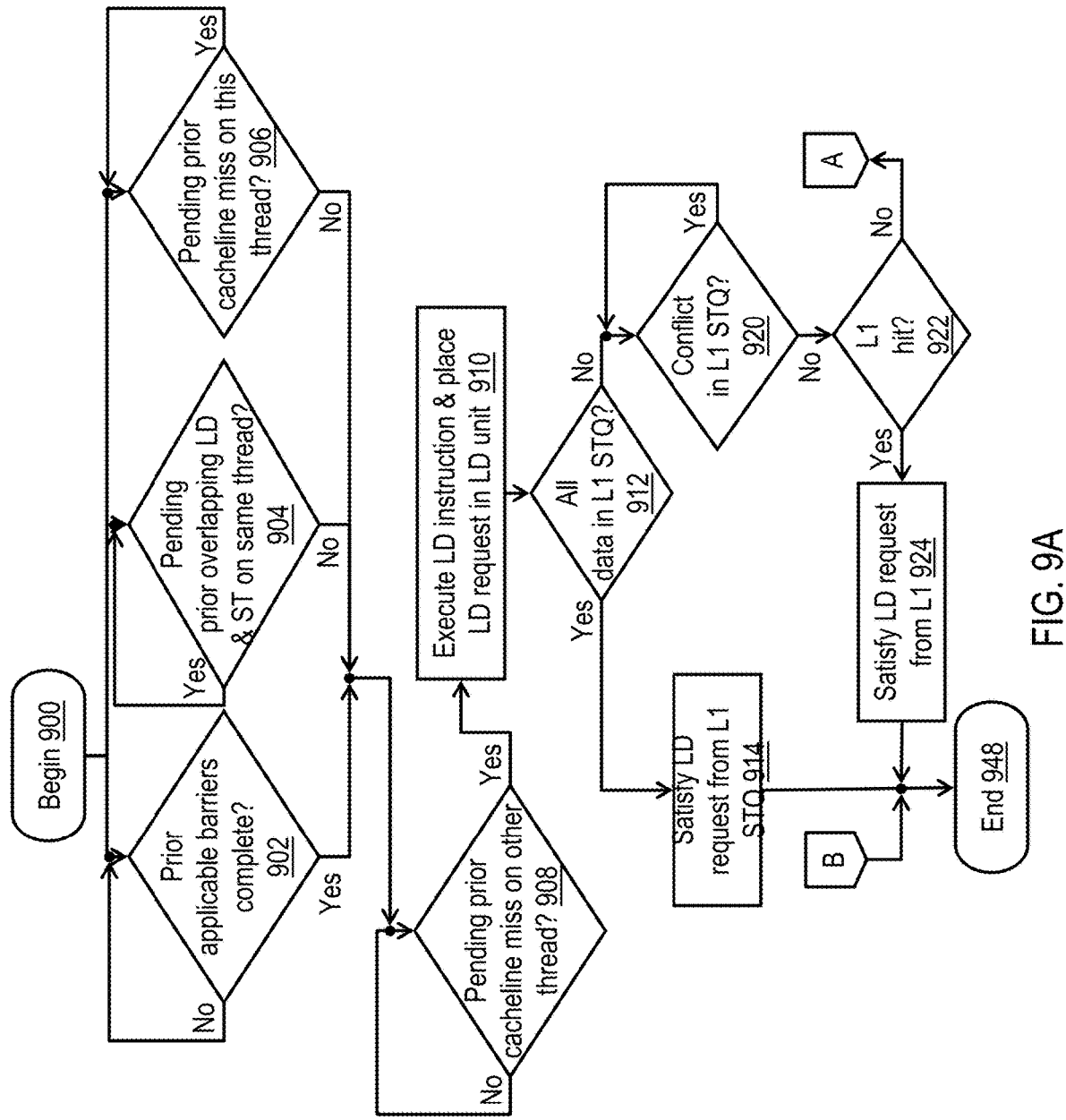
FIGS. 9A-9B together form a high level logical flowchart of an exemplary method by which a processor core processes a load instruction in accordance with one embodiment.
Figure 9B:
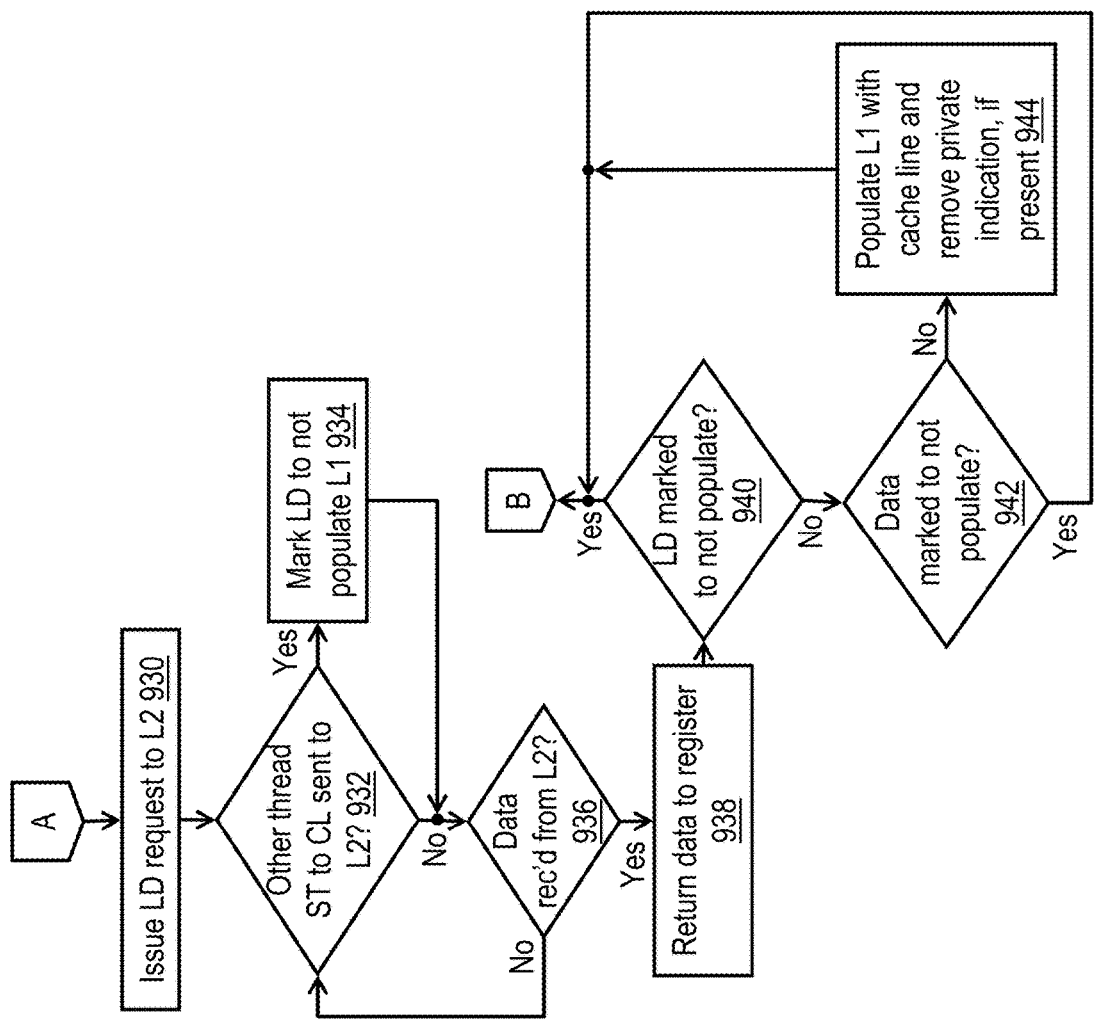

With reference now to FIGS. 9A-9B, a high level logical flowchart of an exemplary method by which a processor core processes a load instruction in accordance with one embodiment is illustrated. The illustrated process details the life cycle of an individual load instruction; thus, many such processes may be running concurrently in a given hardware thread, as well as in multiple hardware threads of exemplary data processing system 100.

The process of FIGS. 9A-9B begins at block 900, for example, in response to ISU 304 of a processor core 200 fetching a load instruction from the shared distributed memory system for execution in a given hardware thread among multiple simultaneous hardware threads of execution. The process then proceeds in parallel to blocks 902-906, which illustrate three independent conditions precedent to execution of the load instruction. In particular, processor core 200 will not release the load instruction for execution until: (1) all previous applicable barriers in the given hardware thread have completed (block 902), as discussed above with respect to FIGS. 5A and 5C (2) all previous load and store instructions in the same hardware thread that target memory locations overlapping with the memory locations read by the load instruction have completed (block 904), as discussed above with reference to FIGS. 4A and 4C, and (3) there are no pending prior cache line misses to the target cache line on the given hardware thread (block 906). Once all of these conditions precedent have been satisfied, the process proceeds to block 908. Block 908 illustrates that processor core 200 also waits to execute the load instruction until there are no pending prior cache line misses to the target cache line from any hardware thread of the processor core 200. The conditions depicted at blocks 906-908 ensure processor core 200 will have only one outstanding load miss to any given cache line at a given time. This restriction prevents needless overloading of duplicate copies of the same cache line from L2 cache 230 in L1 cache 302.

After the condition depicted at block 908 is satisfied, execution units 300 execute the load instruction and place into the load unit 310 a load request corresponding to the executed load instruction (block 910). The load request includes, for example, at least a thread identifier (TID) of the hardware thread that executed the load instruction, a transaction type identifying type of request (i.e., a load), and the target address computed by execution of the load instruction. At block 912, processor core 200 determines whether or not all data requested by the load request is present in the L1 STQ 308 associated with the executing hardware thread. In response to a determination at block 912 that all of the requested data is present in the L1 STQ 308 for the executing hardware thread, processor core 200 satisfies the load request from the relevant L1 STQ 308 by providing a copy of the requested data from L1 STQ 308 to register files 306 (block 914). Consequently, no data needs to be read from L1 cache 302, and no load request need be issued to L2 cache 230. Thereafter, the processing of the load instruction ends at block 948.

In response to a determination at block 912 that all data requested by the load request does not reside in the hardware thread's associated L1 STQ 308, processor core 200 waits at block 920 until all conflicting store requests (i.e., those store requests whose updated memory locations overlap with the memory locations read by the load instruction) in L1 STQ 308, if any, are issued from L1 STQ 308 to L2 STQ 330 (block 920). The load request waits on these store request(s) to be issued because the values returned for the load instruction must reflect the updates due to these conflicting stores. At block 922, processor core 200 determines whether or not the target address of the load request hits in L1 cache 302. If so, processor core 200 satisfies the load request from L1 cache 302 by providing a copy of the requested data to register files 306 (block 924). Consequently, no load request needs to be issued (or is issued) to L2 cache 230. Thereafter, the process of FIG. 9A ends at block 948.

If, however, the load request misses in L1 cache 302 at block 922, the process passes through page connector A to block 930 of FIG. 9B. Block 930 depicts processor core 200 issuing the load request buffered in load unit 308 to an available entry in L2 LDQ 332 for servicing, as discussed below with reference to FIG. 9C. At shown at blocks 932 and 936, processor core 200 then monitors, until the data requested by the load request is returned from L2 cache 230, to determine whether or not a different hardware thread of the processor core 200 has sent a store request targeting the same cache line as the load request to L2 cache 230. If so, LD unit 310 marks the load request to not populate its data in L1 cache 302 (block 934). The load request cannot be allowed to populate L1 cache 302 because doing so while the other threads' stores initiated after the load are in flight could cause the other threads to read older values from the reloaded L1 cache 302 for the memory locations in the same cache line that the other threads' stores are updating. Such read access would violate coherence.

Following a determination at block 936 that the requested load data has been received from L2 cache 230, processor core 200 returns the load data to a register in register files 306 (block 938). Processor core 200 additionally determines at block 940-942 whether or not to populate the L1 cache 302 with the cache line returned from L2 cache 230. In particular, block 940 illustrates processor core 200 determining whether or not the load request was marked to not populate L1 cache 302 at block 934. If so, L1 cache 302 is not populated with the cache line of load data returned by L2 cache 320, and the process passes through page connector B to FIG. 9A and ends at block 948. If the load request is not marked to not populate L1 cache 302, processor core 200 further determines at block 942 whether the cache line of load data returned by L2 cache 230 was marked by L2 cache 230 to not populate L1 cache 302, as discussed below with reference to block 960 of FIG. 9C. If so, the process passes through page connector B to FIG. 9A and ends at block 948. If, however, processor core 200 determines at block 942 that the cache line of load data received from L2 cache 230 was not marked by L2 cache 230 to not populate L1 cache 302, processor core 200 allocates an entry in L1 cache 302, populates the newly allocated entry with the cache line of load data returned by L2 cache 230, and removes the private indication set at block 714 of FIG. 7A (if present), thus returning the cache line to a state in which it can be accessed by all hardware threads of the processor core 200 (block 944). Thereafter, the process passes through page connector B to FIG. 9A and ends at block 948.

Figure 9C:
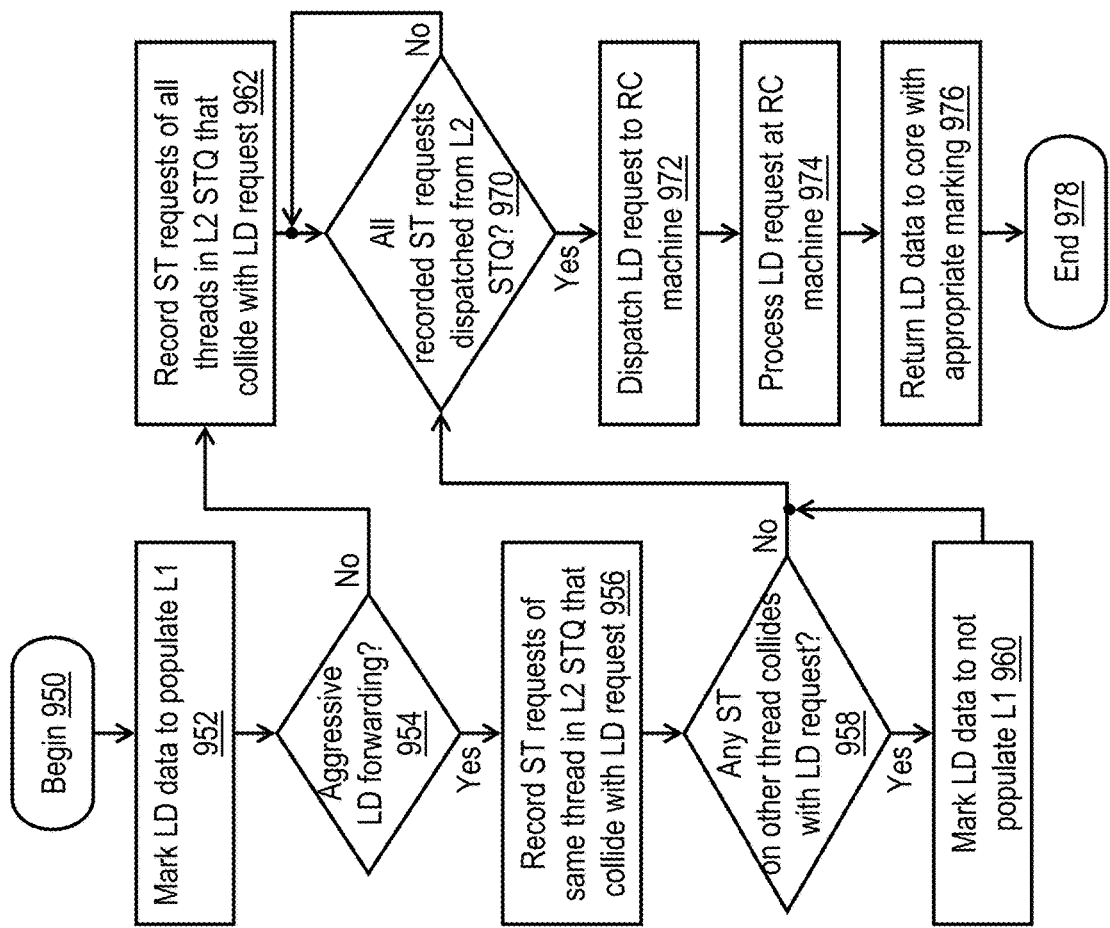
FIG. 9C is a high level logical flowchart of an exemplary method by which a lower level cache processes a load request in accordance with one embodiment.

Referring now to FIG. 9C, there is depicted a high level logical flowchart of an exemplary method by which a lower level cache processes a load request in accordance with one embodiment. The illustrated process details the life cycle of an individual load request in an L2 cache 230; thus, many such processes may be running concurrently in a given L2 cache 230, as well as in multiple L2 caches 230 of exemplary data processing system 100.

The process of FIG. 9C begins at block 950, for example, in response to receipt in an entry of the L2 LDQ 332 of an L2 cache 230 of a load request issued from a load unit 310 of the associated processor core 200 at block 930 of FIG. 9B. At block 952, L2 cache 230 initially marks the load data to populate the L1 cache 302 by default (block 952). The L2 cache 230 additionally determines the set of store requests in L2 cache 230 to be monitored to enforce load-to-store ordering as described above with reference to FIG. 4C. In the described embodiment, L2 cache 230 can implement either of two policies to determine this set of store requests. In particular, in a first policy referred to herein as "aggressive load forwarding," the set of store requests includes conflicting store requests of only the same hardware thread that issued the load request, and the requested load data is returned as quickly as possible to the processor core 200 at the expense of possibly having to mark the load data to not populate L1 cache 302. Under a second policy referred to herein as "normal load forwarding," the set of store requests includes conflicting store requests of all hardware threads of the same processor core 200. With the second policy, the requested load data may be returned to processor core 200 at a higher latency, but is guaranteed to be able to populate L1 cache 302.

Block 954 illustrates a determination of whether or not the aggressive load forwarding policy is implemented. If not, the process proceeds directly to block 962, which illustrates L2 cache 230 recording in association with the load request a set of store requests including store requests of all hardware threads of the associated processor core 200 that are buffered in L2 STQ 330 and that specify a target address in the same target cache line as the load request. Recording this set of store requests ensures that all previous stores to the same cache line by all hardware threads will be processed in L2 cache 230 before the load request is allowed to return data to, and possibly repopulate, L1 cache 302. Therefore, under non-aggressive load forwarding, all L2 reloads can repopulate L1 cache 302 unless a subsequent store to the cache line is recorded at block 934 of FIG. 9B. The process then proceeds to block 970, which is described below. Returning to block 954, in response to a determination that the aggressive load forwarding policy is implemented, L2 cache 230 records in association with the load request a set of store requests includes only those stores in L2 STQ 330 that are issued by the same hardware thread and that specify a target address in the same target cache line as the load request (block 956). L2 cache 230 additionally determines at block 958 whether or not L2 STQ 330 currently buffers any store request of any other hardware thread of the associated processor core 200 (i.e., not of the hardware thread that issued the load request) that specifies a target address in the same target cache line as the load request. These store updates, if any, could be masked to the hardware threads that issued them by reloading the current L2 cache line data image into L1 cache 302. Such a reload would violate coherence. L2 cache 230 therefore marks the load data of the load request to not populate L1 cache 302, as mentioned above with reference to block 942 (block 960). Following block 960 or in response to a negative determination at block 958, the process proceeds to block 970.

Block 970 illustrates L2 cache 230 enforcing load-to-store ordering by waiting to issue the load request from L2 LDQ 332 until all store requests, if any, recorded at either block 956 or block 962 have been dispatched from L2 STQ 330. Following block 970, L2 cache 230 dispatches the load request from L2 LDQ 332 to an available RC machine 334 of L2 cache 230 for processing (block 972). In response to receipt of the store request, the RC machine 334 processes the load request (block 974). For example, if the load request misses in L2 directory 322, RC machine 334 obtains a copy of the target cache line with read authority, places a copy of the target cache line in L2 array 320, and updates the entry in L2 directory 322 for the target cache line to an appropriate coherence state. If the load request hits in L2 directory 322, RC machine 334 simply reads out a copy of the target cache line from L2 array 320. L2 cache 230 then returns a copy of the target cache line to the processor core 200, with the marking established at either block 952 or block 960 (block 976). Thereafter, the process of Figure (C ends at block 978.

Figure 10:
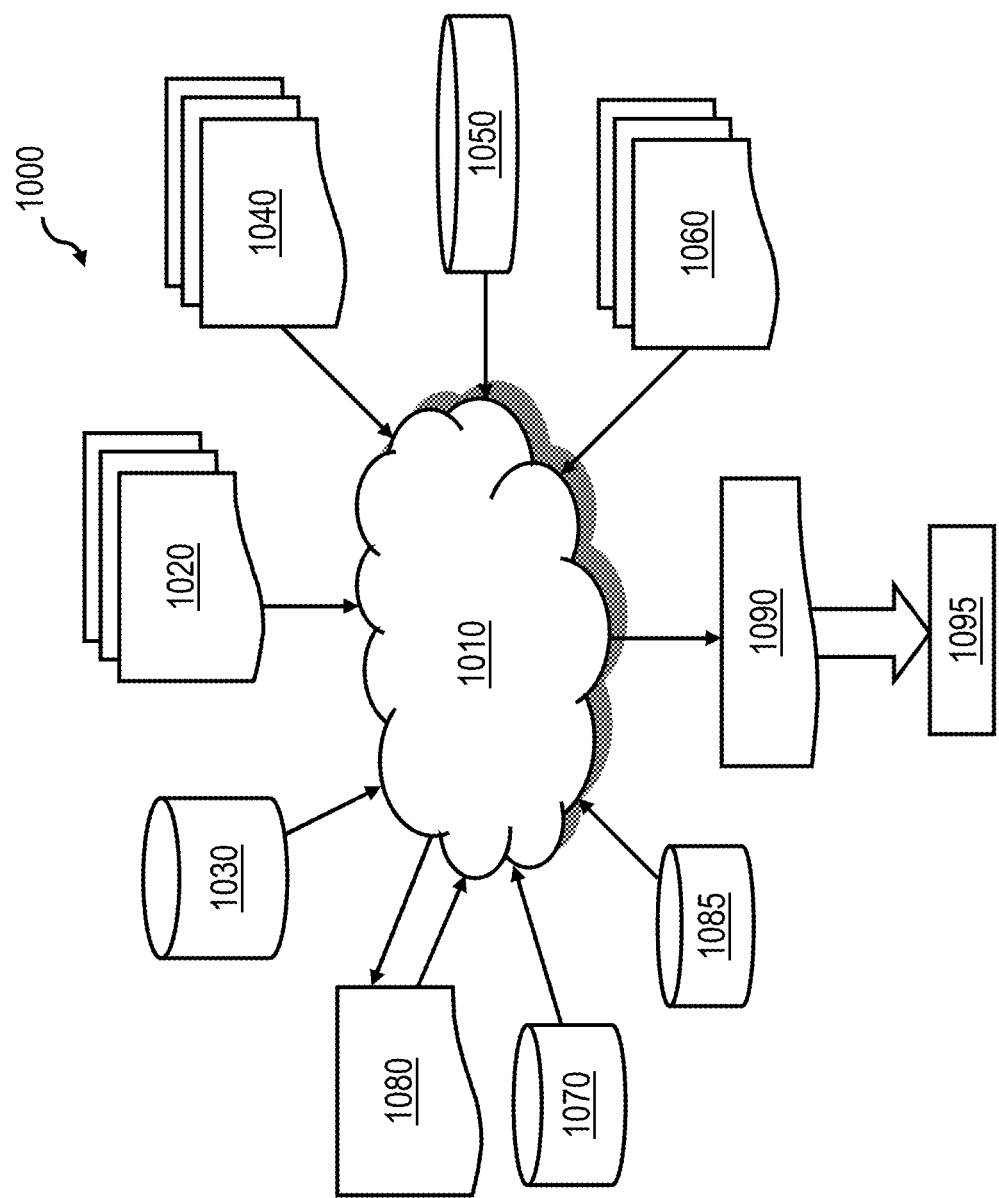
FIG. 10 is a data flow diagram illustrating a design process.

With reference now to FIG. 10, there is depicted a block diagram of an exemplary design flow 1000 used for example, in semiconductor IC logic design, simulation, test, layout, and manufacture. Design flow 1000 includes processes, machines and/or mechanisms for processing design structures or devices to generate logically or otherwise functionally equivalent representations of the design structures and/or devices described above and shown in FIGS. 1-3. The design structures processed and/or generated by design flow 1000 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1000 may vary depending on the type of representation being designed. For example, a design flow 1000 for building an application specific IC (ASIC) may differ from a design flow 1000 for designing a standard component or from a design flow 1000 for instantiating the design into a programmable array, for example a programmable gate array (PGA) or a field programmable gate array (FPGA) offered by Altera® Inc. or Xilinx® Inc.

FIG. 10 illustrates multiple such design structures including an input design structure 1020 that is preferably processed by a design process 1000. Design structure 1020 may be a logical simulation design structure generated and processed by design process 1000 to produce a logically equivalent functional representation of a hardware device. Design structure 1020 may also or alternatively comprise data and/or program instructions that when processed by design process 1000, generate a functional representation of the physical structure of a hardware device. Whether representing functional and/or structural design features, design structure 1020 may be generated using electronic computer-aided design (ECAD) such as implemented by a core developer/designer. When encoded on a machine-readable data transmission, gate array, or storage medium, design structure 1020 may be accessed and processed by one or more hardware and/or software modules within design process 1000 to simulate or otherwise functionally represent an electronic component, circuit, electronic or logic module, apparatus, device, or system such as those shown in FIGS. 1-3. As such, design structure 1020 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1000 preferably employs and incorporates hardware and/or software modules for synthesizing, translating, or otherwise processing a design/simulation functional equivalent of the components, circuits, devices, or logic structures shown in FIGS. 1-3 to generate a netlist 1080 which may contain design structures such as design structure 1020. Netlist 1080 may comprise, for example, compiled or otherwise processed data structures representing a list of wires, discrete components, logic gates, control circuits, I/O devices, models, etc. that describes the connections to other elements and circuits in an integrated circuit design. Netlist 1080 may be synthesized using an iterative process in which netlist 1080 is resynthesized one or more times depending on design specifications and parameters for the device. As with other design structure types described herein, netlist 1080 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1000 may include hardware and software modules for processing a variety of input data structure types including netlist 1080. Such data structure types may reside, for example, within library elements 1030 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1040, characterization data 1050, verification data 1060, design rules 1070, and test data files 1085 which may include input test patterns, output test results, and other testing information. Design process 1000 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1000 without deviating from the scope and spirit of the invention. Design process 1000 may also include modules for performing standard circuit design processes such as timing analysis, verification, design rule checking, place and route operations, etc.

Design process 1000 employs and incorporates logic and physical design tools such as HDL compilers and simulation model build tools to process design structure 1020 together with some or all of the depicted supporting data structures along with any additional mechanical design or data (if applicable), to generate a second design structure 1090. Design structure 1090 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1020, design structure 1090 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-3. In one embodiment, design structure 1090 may comprise a compiled, executable HDL simulation model that functionally simulates the devices shown in FIGS. 1-3.

Design structure 1090 may also employ a data format used for the exchange of layout data of integrated circuits and/or symbolic data format (e.g., information stored in a GDSII (GDS2), GL1, OASIS, map files, or any other suitable format for storing such design data structures). Design structure 1090 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-3. Design structure 1090 may then proceed to a stage 1095 where, for example, design structure 1090: proceeds to tape-out, is released to manufacturing, is released to a mask house, is sent to another design house, is sent back to the customer, etc.

As has been described, in at least one embodiment A data processing system includes a processor core having a shared store-through upper level cache and a store-in lower level cache. The processor core executes a plurality of simultaneous hardware threads of execution including at least a first thread and a second thread, and the shared store-through upper level cache stores a first cache line accessible to both the first thread and the second thread. The processor core executes in the first thread a store instruction that generates a store request specifying a target address of a storage location corresponding to the first cache line. Based on the target address hitting in the shared store-through upper level cache, the first cache line is temporarily marked, in the shared store-through upper level cache, as private to the first thread, such that any memory access request by the second thread targeting the storage location will miss in the shared store-through upper level cache.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like, but excludes non-statutory subject matter, such as propagating signals per se, transmission media per se, and forms of energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system including a processor core having a shared store-through upper level cache and a store-in lower level cache, the method comprising:
   the processor core executing a plurality of simultaneous hardware threads of execution including at least a first thread and a second thread;
   storing in the shared store-through upper level cache a first cache line accessible to both the first thread and the second thread;
   the processor core executing in the first thread a store instruction that generates a store request specifying a target address of a storage location corresponding to the first cache line; and
   based on the target address hitting in the shared store-through upper level cache, temporarily marking, in the shared store-through upper level cache, the first cache line as private to the first thread, such that any memory access request by the second thread targeting the storage location will miss in the shared store-through upper level cache.

2. The method of claim 1, and further comprising removing the marking and again making the first cache line accessible to both the first thread and the second thread in response to reloading the first cache line from the store-in lower level cache to the shared store-through upper level cache.

3. The method of claim 1, and further comprising:
   issuing the store request from the shared store-through upper level cache to the store-in lower level cache; and
   at the store-in lower level cache, ordering the store request with respect to any older store requests of the first thread to the first cache line and with respect to any older barrier requests of the first thread, but not with respect to store and barrier requests of the second thread.

4. The method of claim 1, and further comprising the store-in lower level cache ordering barrier requests of the first thread with respect to any older store requests of the first thread and with respect to any older barrier requests of the first thread, but not with respect to store and barrier requests of the second thread.

5. The method of claim 1, and further comprising:
   while the first cache line is marked private in the shared store-through upper level cache, servicing a read request of the first thread from the first cache line in the store-through upper level cache.

6. The method of claim 1, and further comprising:
   the processor core marking a load request of the second thread targeting the first cache line not to populate the shared store-through upper level cache with data based on the store request of the first thread.

7. The method of claim 1, and further comprising:
   issuing the store request from the processor core to the store-in lower level cache; and
   the store-in lower level cache marking load data for a load request of the second thread targeting the first cache line not to populate the shared store-through upper level cache with data based on the store request of the first thread.

8. A processing unit, comprising:
   a processor core including at least one execution unit for executing a plurality of simultaneous hardware threads of execution including at least a first thread and a second thread, wherein the processor core executes in the first thread a store instruction that generates a store request specifying a target address of a storage location corresponding to a first cache line;
   a shared store-through upper level cache, coupled to the processor core, that, based on the target address of the store request hitting in the shared store-through upper level cache, temporarily marks, in the shared store-through upper level cache, the first cache line as private to the first thread, such that any memory access request by the second thread targeting the storage location will miss in the shared store-through upper level cache; and
   a store-in lower level cache coupled to the shared store-through upper level cache.

9. The processing unit of claim 8, wherein the processor core makes the first cache line accessible to both the first thread and the second thread in response to reloading the first cache line from the store-in lower level cache to the shared store-through upper level cache.

10. The processing unit of claim 8, wherein the store-in lower level cache, responsive to receipt of the store request, orders the store request with respect to any older store requests of the first thread to the first cache line and with respect to any older barrier requests of the first thread, but not with respect to store and barrier requests of the second thread.

11. The processing unit of claim 8, wherein the store-in lower level cache orders barrier requests of the first thread with respect to any older store requests of the first thread and with respect to any older barrier requests of the first thread, but not with respect to store and barrier requests of the second thread.

12. The processing unit of claim 8, wherein the processor core, while the first cache line is marked private in the shared store-through upper level cache, services a read request of the first thread from the first cache line in the store-through upper level cache.

13. The processing unit of claim 8, wherein the processor core marks a load request of the second thread targeting the first cache line not to populate the shared store-through upper level cache with data based on the store request of the first thread.

14. The processing unit of claim 8, wherein the store-in lower level cache, responsive to receipt of the store request from the processor core to the store-in lower level cache, marks load data for a load request of the second thread targeting the first cache line not to populate the shared store-through upper level cache with data based on the store request of the first thread.

15. A data processing system comprising:
- a plurality of processing units in accordance with claim 8; and
- a interconnect fabric coupling the plurality of processing units for communication.

16. A design structure tangibly embodied in a machine-readable storage device for designing, manufacturing, or testing an integrated circuit, the design structure comprising:
- a processing unit, including:
  - a processor core including at least one execution unit for executing a plurality of simultaneous hardware threads of execution including at least a first thread and a second thread, wherein the processor core executes in the first thread a store instruction that generates a store request specifying a target address of a storage location corresponding to a first cache line;
  - a shared store-through upper level cache, coupled to the processor core, that, based on the target address of the store request hitting in the shared store-through upper level cache, temporarily marks, in the shared store-through upper level cache, the first cache line as private to the first thread, such that any memory access request by the second thread targeting the storage location will miss in the shared store-through upper level cache; and
  - a store-in lower level cache coupled to the shared store-through upper level cache.

17. The design structure of claim 16, wherein the processor core makes the first cache line accessible to both the first thread and the second thread in response to reloading the first cache line from the store-in lower level cache to the shared store-through upper level cache.

18. The design structure of claim 16, wherein the store-in lower level cache, responsive to receipt of the store request, orders the store request with respect to any older store requests of the first thread to the first cache line and with respect to any older barrier requests of the first thread, but not with respect to store and barrier requests of the second thread.

19. The design structure of claim 16, wherein the store-in lower level cache orders barrier requests of the first thread with respect to any older store requests of the first thread and with respect to any older barrier requests of the first thread, but not with respect to store and barrier requests of the second thread.

20. The design structure of claim 16, wherein the processor core marks a load request of the second thread targeting the first cache line not to populate the shared store-through upper level cache with data based on the store request of the first thread.

\* \* \* \* \*